United States Patent [19]
Green

[11] Patent Number: 5,315,083
[45] Date of Patent: May 24, 1994

[54] MICROWAVE COOKING UTENSIL

[76] Inventor: Robert E. Green, 909 N. Front St., Marquette, Mich. 49855

[21] Appl. No.: 881,883

[22] Filed: May 12, 1992

[51] Int. Cl.⁵ ............................................. H05B 6/80
[52] U.S. Cl. .................................. 219/734; 219/689; 426/107; 426/113; 426/234; 426/243; 99/DIG. 14
[58] Field of Search ................. 219/10.55 A, 10.55 E, 219/10.55 F, 10.55 M; 426/107, 113, 234, 243; 99/DIG. 14

[56] References Cited

U.S. PATENT DOCUMENTS

| | | | |
|---|---|---|---|
| 293,192 | 12/1887 | Baggioili | D7/354 |
| 293,193 | 12/1887 | Vendervoort | D7/357 |
| 293,872 | 1/1888 | Wang | D7/354 |
| 2,600,566 | 6/1952 | Moffet | 219/10.55 E |
| 2,714,070 | 7/1955 | Welch | 219/10.55 E |
| 3,288,054 | 10/1960 | Weprin et al. | 99/260 |
| 3,399,858 | 9/1968 | Luker | 249/117 |
| 3,983,256 | 9/1976 | Norris et al. | 219/10.55 E |
| 4,043,260 | 8/1977 | LaPour et al. | 99/421 HH |
| 4,086,813 | 5/1978 | Meek et al. | 73/352 |
| 4,144,435 | 3/1979 | Clark et al. | 219/10.55 E |
| 4,196,221 | 4/1980 | Dew | 426/235 |
| 4,233,325 | 11/1980 | Slangan et al. | 426/107 |
| 4,280,032 | 7/1981 | Levinson | 219/10.55 E |
| 4,343,979 | 8/1982 | Barbini et al. | 219/10.55 A |
| 4,416,906 | 11/1983 | Watkins | 426/107 |
| 4,416,907 | 11/1983 | Watkins | 426/234 |
| 4,503,307 | 3/1985 | Campbell et al. | 219/10.55 E |
| 4,532,397 | 7/1985 | McClelland | 219/10.55 E |
| 4,558,197 | 12/1985 | Wyatt | 219/10.55 E |
| 4,593,171 | 6/1986 | Colato | 219/10.55 M |
| 4,663,506 | 5/1987 | Bowen et al. | 219/10.55 E |
| 4,684,777 | 8/1987 | Eves, II et al. | 219/10.55 A |
| 4,794,008 | 12/1988 | Schmidt et al. | 426/234 |
| 4,876,428 | 10/1989 | Petcavich | 219/10.55 E |
| 4,896,011 | 1/1990 | Trucks | 219/10.55 E |
| 4,906,806 | 3/1990 | Levinson | 219/10.55 E |
| 4,924,048 | 5/1990 | Bunce et al. | 219/10.55 E |
| 4,952,765 | 8/1990 | Toyosawa | 219/10.55 E |
| 4,967,049 | 10/1990 | Kaneshiro et al. | 219/10.55 B |
| 4,980,529 | 12/1990 | Bolton | 219/10.55 M |
| 5,101,084 | 3/1992 | Atwell et al. | 219/10.55 M |

Primary Examiner—Bruce A. Reynolds
Assistant Examiner—Tu Hoang
Attorney, Agent, or Firm—Levy, Zito & Grandinetti

[57] ABSTRACT

A microwave utensil for heating two different foods having different microwave absorbing properties allows the foods to be heated simultaneously without overheating one of the foods. The utensil includes a lower vessel to receive a first food and a second vessel which is nested within the first vessel to displace a portion of the first food item. A second food item is placed in the second vessel such that the first food item shields the sides of the second food.

13 Claims, 3 Drawing Sheets

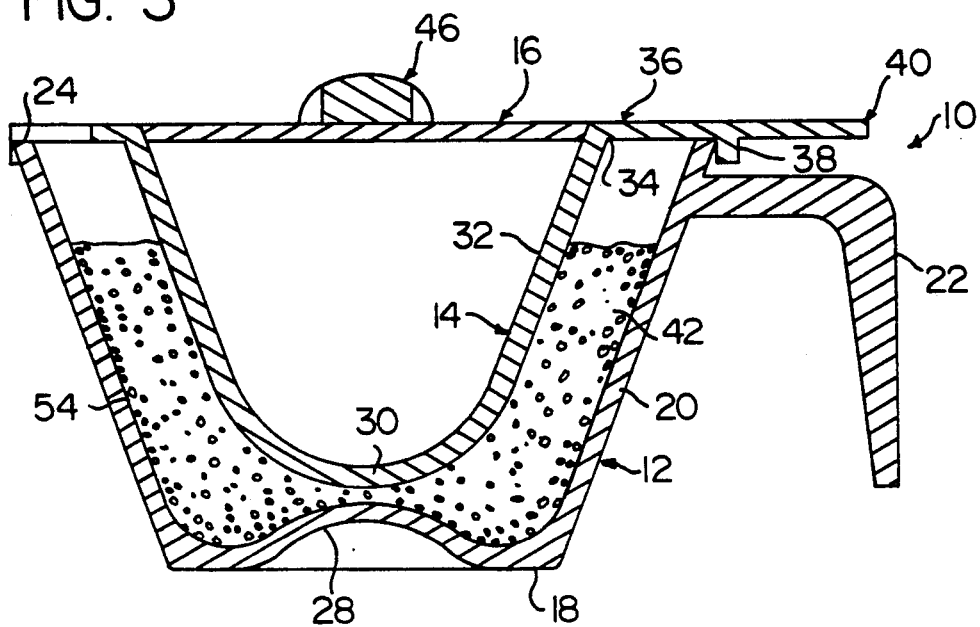
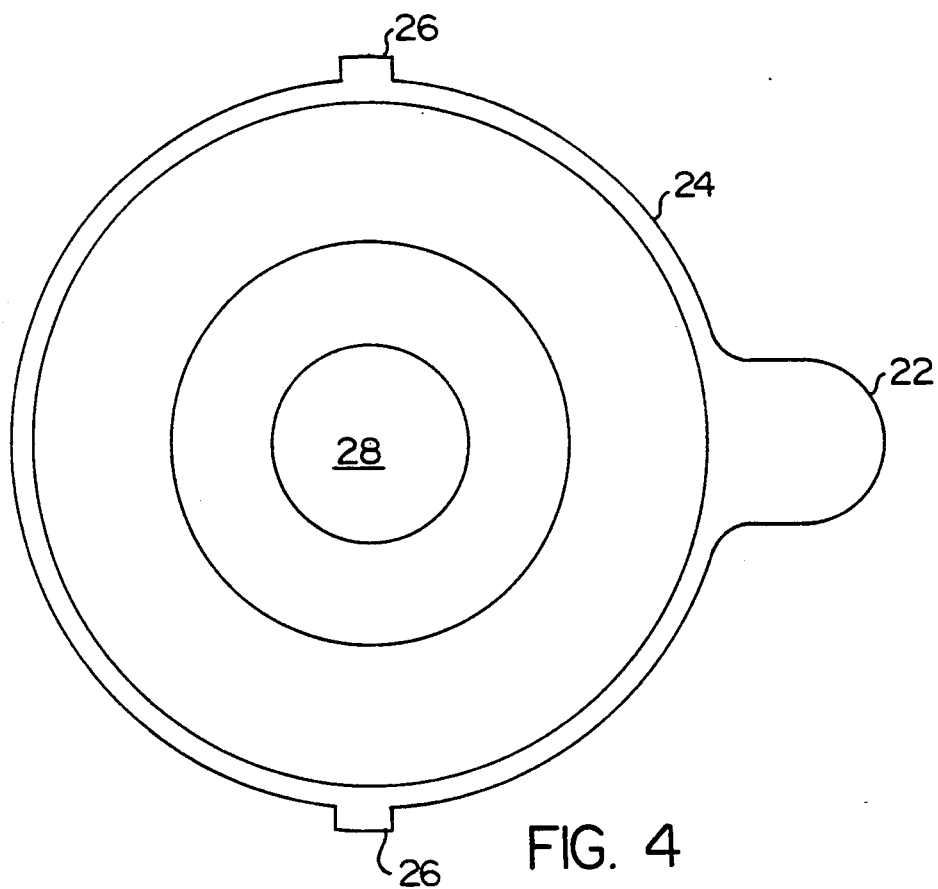

MICROWAVE COOKING UTENSIL

BACKGROUND OF THE INVENTION

1. Field of the Invention

The present invention is directed to a method and apparatus for cooking or heating foods in a microwave oven. More particularly, the invention relates to a microwave cooking vessel adapted for heating two different foods having different microwave absorbing properties.

2. Description of Related Art

In recent years the use of microwave ovens to heat or cook foods has increased markedly, both in the home and in commercial establishments. This statement is true for numerous reasons. For example, microwave ovens require no prewarming, heat efficiently, and result in energy savings. Many foods demonstrate a superior taste when prepared in a microwave oven and retain more of their nutritional components. Microwave ovens are perhaps best known for the speed with which they heat or cook. Microwaves further offer both the homemaker and the commercial establishment rapid reheating of refrigerated pre-cooked foods.

Microwave ovens are not, however, without certain disadvantages. For example, heating or cooking by means of a microwave oven is so rapid that an error of several minutes can make the difference between a well done roast and a rare roast or properly cooked foods and overcooked foods. Each food product, itself, possesses characteristics having a marked influence on cooking or heating time. For example, such a factor as the quantity of the food product to be heated or cooked, the size of the food product, the shape of the food product, its consistency and its dielectric properties all influence the rapidity and uniformity with which it will be heated or cooked in a microwave oven.

Furthermore, microwave ovens by different manufacturers differ in power outputs. Most domestic microwave ovens are produced with power outputs in the range of 600 watts to 1000 watts at a nominal frequency of 2,450 million cycles per second (2,450 MH). The nominal frequency assigned to microwave cooking is 915 MHz with a nominal wavelength of 33 cm (12.9 inches). Finally, the microwaves within the oven chamber tend in some places to reinforce each other and in other places to cancel each other with the result that a food product being heated or cooked in the microwave oven will often demonstrate hot and cold spots, adversely effecting the uniformity of heating or cooking.

All of the above noted factors result in the fact that heating or cooking with a microwave oven is, generally, more critical with respect to time than is conventional heating or cooking. It is not practical to attempt to simultaneously heat or cook several food products having different temperature requirements or energy absorbing characteristics. Furthermore, it is not practical to prepare one set of cooking instructions, based on time, which would be universally applicable to all microwave ovens.

Efforts to overcome the disadvantages of the previous microwave cooking utensils has resulted in numerous designs for packaging and cookware. For example, U.S. Pat. No. 4,416,907 to Watkins relates to a disposable microwave food container having a, generally, bowl-shaped bottom to hold the food. The bottom of the container is transparent to microwave energy. Within the container is a low loss core formed from microwave transparent packaging material. The core extends vertically between the top and bottom of the container to provide a tubular microwave influx passage through the food within the container. The outer sidewall includes an aluminum foil strip to reflect the microwave energy. In one embodiment, the core extends downward from the top to provide the influx of microwave energy.

U.S. Pat. No. 4,663,506 to Bowen et al. discloses a microwave cake and bread maker for browning a food body. A microwave absorbing material, such as separate layers of ferrite, absorbs microwave energy to provide heat for heating the food by conduction, thermal radiation and convection. The container in one embodiment is formed from a microwave reflective material with a microwave absorbing material on the bottom and side surfaces.

U.S. Pat. No. 4,280,032 to Levinson discloses a cooking container for use in a microwave oven. The container includes an outer microwave permeable container for containing water. An inner container has a coating of a microwave reflective material to limit exposure to the top of an egg within the inner container and to preclude microwave exposure to the bottom and sides. The inner container is nested within the outer container containing the water such that during microwave heating the egg cooks by convection and conductive heat rather than microwave energy.

Other examples of microwave cooking utensils may be found in U.S. Pat. No. 4,144,435 to Clark et al. and U.S. Pat. No. 4,952,765 to Toyosawa. The above-noted inventions have not been entirely successful in producing a microwave cooking vessel. Moreover, the prior art microwave cooking vessels are not able to effectively heat two different food products simultaneously such that the two foods are cooked and heated uniformly.

SUMMARY OF THE INVENTION

The disadvantages and limitations of the previous microwave cooking utensils are obviated by the present invention while providing a device for uniformly heating or cooking two materials having different microwave absorbing properties. The microwave utensil of the invention is relatively simple to manufacture and use and can be produced economically.

The microwave cooking and heating utensil of the invention includes a first lower vessel for containing a first food. The first vessel preferably has a bottom wall to support the vessel in an upright position when placed on a horizontal surface and an annular shaped side wall. In a preferred embodiment, the annular side wall is frusto-conical shaped expanding upwardly such that the upper edge is slightly wider than the base.

A second or inner vessel for containing a second food has a similar bottom wall and a frusto-conical side wall. The second vessel is preferably dimensioned to fit within the first vessel to displace a portion of the food and to form an annular space within the first vessel. A radially extending flange depends from the upper edge of the wall to engage the wall of the first vessel. In preferred embodiments, the depending flange of the second vessel rests on top of the wall of the first vessel to support the second vessel.

A cover is placed on the second vessel to cover the food contained therein. Typically, the cover is also made from a microwave permeable material and contains at least one vent to permit the escape of steam during microwave heating.

During use, a first food is placed in the first vessel and the second food is placed in the second vessel. The apparatus is particularly suitable for heating two different foods having different microwave absorbing characteristics. Preferably, the food requiring a longer cooking or heating time is placed in the first vessel.

The second vessel is placed in the first vessel to displace a portion the food in the first vessel thereby forming a hollow void in the center of the food. A cover is placed on the second vessel to close the vessel. The vessels are then subjected to microwave energy to heat the foods simultaneously. Since the food in the inner vessel requires less energy to heat, the two foods can be heated simultaneously and each can achieve the desired degree of cooking simultaneously.

BRIEF DESCRIPTION OF THE DRAWINGS

The invention is described in conjunction with the drawings of which the following is a brief description.

FIG. 3 is a cross sectional view of the assembled cooking utensil.

FIG. 4 is a top plan view of the lower vessel in accordance with the invention.

DETAILED DESCRIPTION OF THE INVENTION

The present invention is directed to microwave cooking and heating utensils for uniformly heating one or more foods. The utensil has the distinct advantage of supporting the food in a manner such that the food heats much more uniformly than in conventional microwave containers without the need to rotate the utensil or stir the food during the microwave step.

The utensil achieves the uniform heating and cooking basically by eliminating the food from areas which are not directly penetrated by the microwaves. It is well known that microwaves penetrate a short distance the surface of the food to directly heat the outer surface of the food in the areas penetrated by the microwaves. The remaining center portions of the food are, thus, heated by conduction of the heat through the food product. A common problem is that the areas being directly heated by the microwaves tend to overcook due to the rapid and intense heating by microwaves. Accordingly, portions of the food tend to dry out before the center portions are completely cooked.

The utensil of the invention forms a void in a substantial area of the food which is not directly heated by microwave energy, thereby reducing the risk of overcooking portions of the food before the center portions are sufficiently cooked. In preferred embodiments of the invention, the void is formed by a second vessel dimensioned to fit within the first vessel. The second vessel can be suspended from the upper edge of the first vessel so that a substantially uniform annular space is formed within the first vessel.

The invention is further directed to a microwave heating and cooking utensil for heating different foods which typically require different amounts of energy to heat. Since some foods require less time to heat and cook than other foods, it is necessary to arrange the different foods so that the foods achieve the desired degree of cooking simultaneously. It is has been found that the food which requires less time to heat can be placed in the second vessel so that the food in the first vessel absorbs a larger portion the microwave energy and, in effect, shields the food in the second vessel to prevent overheating or overcooking. The microwaves penetrate the food in the second vessel through the upper end to heat the food. Since the open upper end of the second vessel is relatively small compared to the overall size of the vessel and the amount of microwave energy entering second vessel is small compared to the first vessel, the food in the second vessel cooks at a slower rate.

Referring to FIGS. 1 through 4, the microwave heating and cooking utensil 10 in a preferred embodiment includes a first primary vessel 12, a second inner vessel 14 and a cover 16. The first and second vessels and the cover are all, preferably, made of a microwave transparent material.

Figure 1:
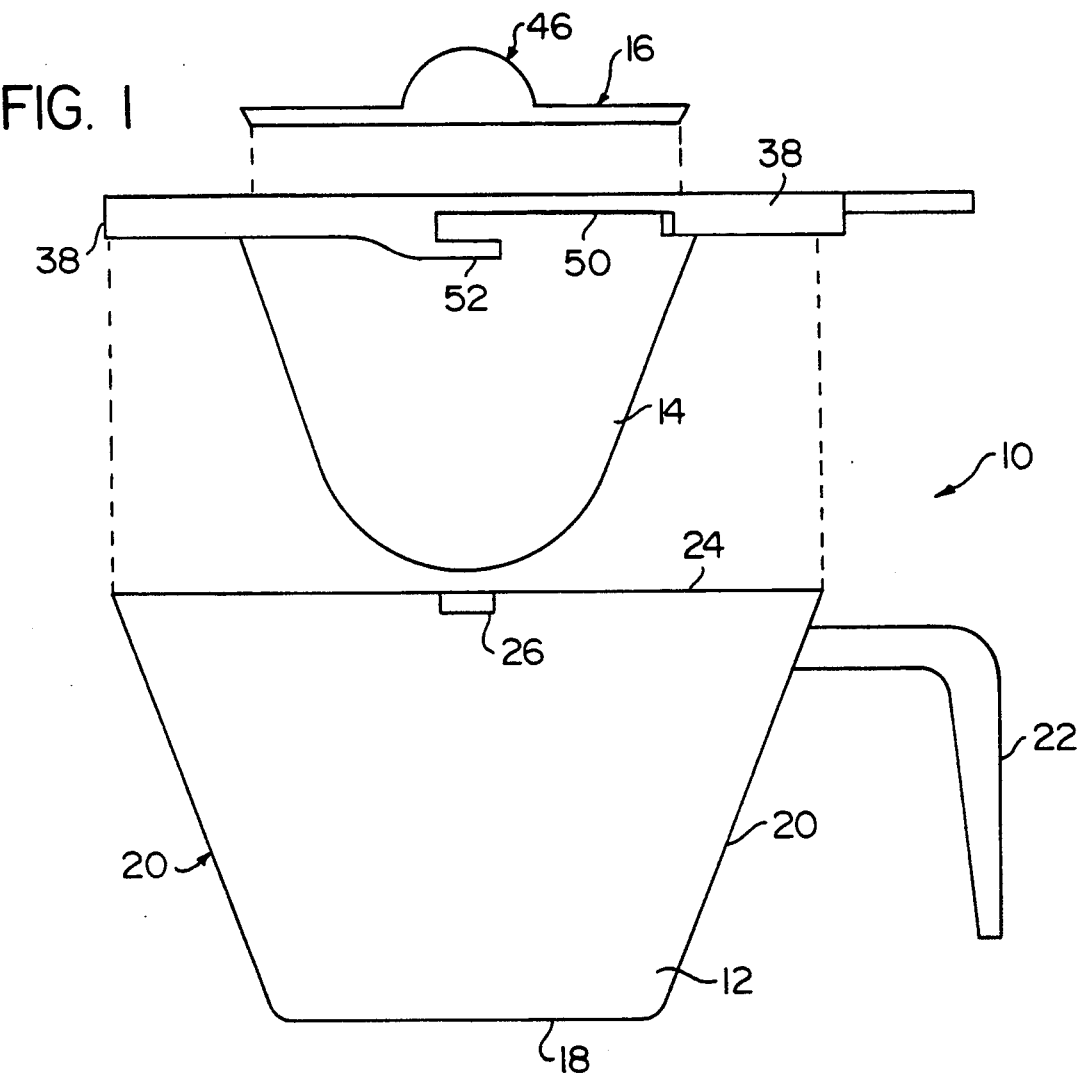
FIG. 1 is an exploded view of a preferred embodiment of the cooking utensil in accordance with the invention.

As illustrated in the exploded view of FIG. 1, the first vessel 12 is preferably a cup-shaped vessel having a bottom wall 18 and a frusto-conical shaped side wall 20. A handle member 22 extends from the side wall 20 to facilitate handling the vessel when it is full of hot food. The side wall 20 terminates at an upper edge 24 having a width greater than the width of the bottom wall. As best shown in FIG. 4, a pair of locking tabs 26 extend radially outward from the upper edge 24 for locking the second vessel in place, as discussed hereinafter in greater detail.

The bottom wall 18 as shown in the cross-sectional view of FIG. 3 has a center portion 28 forming a dimple-like protrusion extending upwardly from the bottom wall 18. Preferably the center portion 28 is a rounded, dome shape. The raised center portion 28 reduces the amount of food in the center of the vessel which cannot be directly heated by microwave energy.

In the embodiment shown in FIGS. 1 through 4, the first vessel 12 is preferably a frusto-conical shape. However, the first vessel may, alternatively, be a cylindrical shape. Round vessels are, generally, preferred to permit microwave penetration in a uniform fashion around the periphery of the vessel. Square and rectangular vessels tend to promote the formation of hot spots in the corners of the vessel and, therefore, are generally less preferred.

The second vessel 14 includes a bottom wall 30 and a side wall 32 terminating at an upper end 34. As shown in FIG. 4, the second vessel 14, preferably, has a frusto-conical shaped side wall 32 and a rounded bottom wall 30. A depending flange 36 extends radially outward from the upper edge 34. The flange 36 has a width sufficient to cover the opening of the first vessel 12 and to suspend the second vessel 14 within the first vessel. A downwardly extending lip 38 depends perpendicularly from the outer peripheral edge of the flange 36 to engage the outer surface of the first vessel 12. A handle 40 extends radially outward from the flange 36.

The side wall 32 of the second vessel 14 preferably has the same angle of inclination as the side wall 20 of the first vessel 12. During use, the second vessel 14 is nested or placed in the first vessel such that the bottom wall 30 of the second vessel 14 displaces a center portion of the food in the first vessel. In the assembled form as shown in FIG. 4, the second inner vessel 14 defines an annular space 42 between the side wall 32 and side wall 20. In preferred embodiments, the side walls 20 and 32 complement each other and are substantially parallel such that the annular space 42 has a substantially uniform width. The annular space 42 defines an annular column of food of uniform thickness conducive to uniform microwave penetration and heating.

The bottom wall 30 of the second vessel 30 is preferably rounded as shown in the cross section of FIG. 4. The second vessel 14 is, preferably, dimensioned such that the bottom wall 30 is spaced from the center portion 28 of the first vessel 12 a distance less than the width of the annular space 42. In this manner, the volume of food is reduced in the center of the vessel which is not penetrated by microwave energy and must be heated by thermal conduction through the food. Limiting the amount of food which must be heated by thermal conduction reduces the occurrence of overheating of some areas of the food. Foods which readily absorb microwave energy are more susceptible to formation of hot spots and over cooking since the food is typically not able to conduct the heat away from the hot spots at a sufficient rate to prevent over cooking.

The bottom wall 30 of the second vessel 14 is shown as a substantially spherical shape. The spherical bottom has been found to enhance uniform heating. Alternatively, the bottom wall 30 can be planar. In all events, the bottom 30 is, preferably, spaced a slight distance from the bottom wall 18 of the first vessel 12 to reduce the amount of food in the center portion of first vessel 12.

Figure 2:
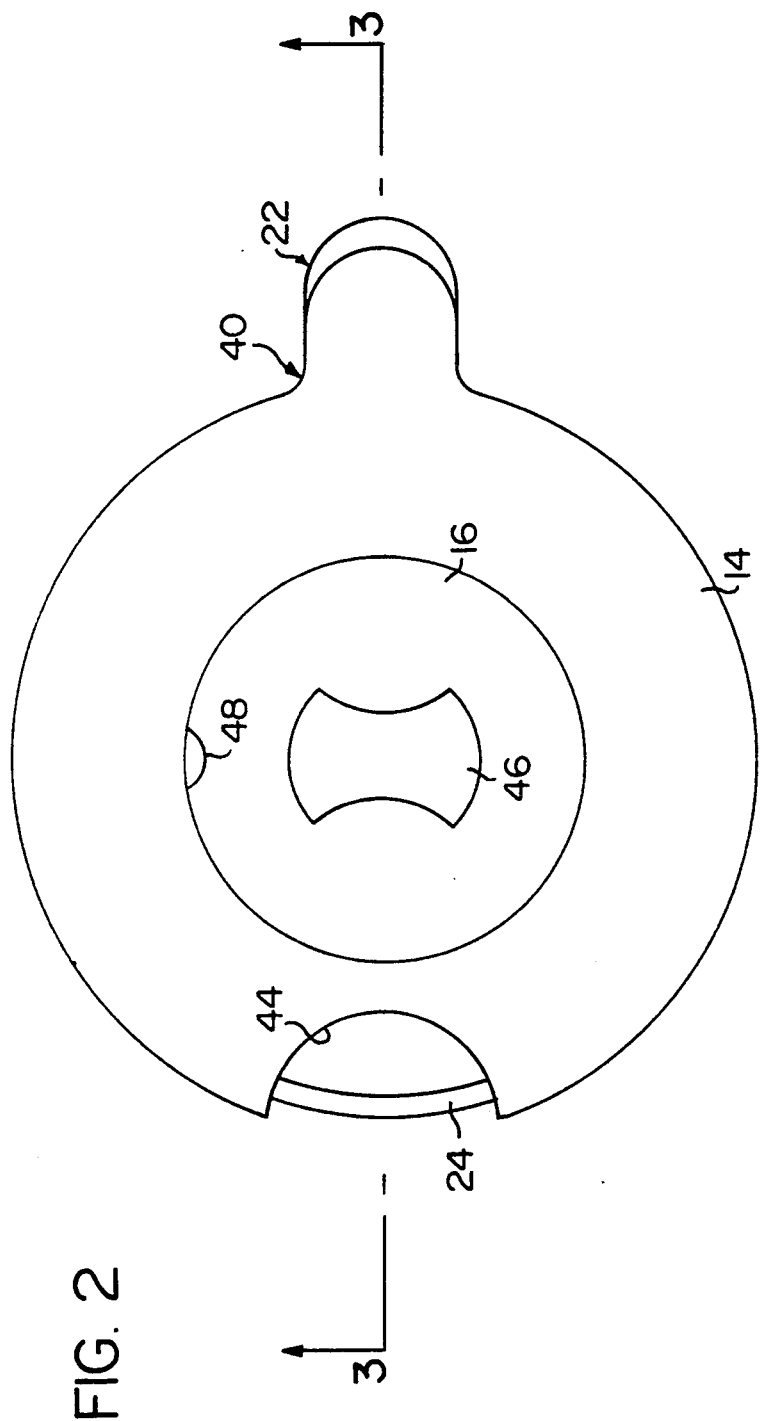
FIG. 2 is a top plan view of the embodiment of FIG. 1.

Referring to FIG. 2, the flange 36 of the second vessel 14 includes an opening 44 to allow venting of the annular space 42 during heating. In the embodiment of FIG. 2, the opening 44 is in the form of a substantially U-shaped notch positioned opposite the handle 40. The opening can also serve as a pouring spout to dispense the liquid contents of the first vessel 12.

The lid or cover 16 is, preferably, a microwave permeable material which fits securely in the opening of the second vessel 14. A handle 46 is provided on the upper surface to facilitate handling of the dover 16. The cover 16 further includes a vent opening 48 to allow steam and pressure to escape.

The peripheral edge of the cover 16, preferably, seats tightly against the inner rim of the second vessel 14. In this manner, the contents of the first vessel 12 can be poured without spilling the contents of the second vessel 14. When pouring from the first vessel, the vent 48 should be positioned opposite the opening 44 by rotating the cover 16 to the desired position.

In preferred embodiments, the first and second vessels 12 and 14 include a locking means to removably couple the vessels together during use. In the embodiment of the invention illustrated in FIG. 1, the first vessel 12 includes an outwardly extending locking tab 26 on each side of the vessel adjacent the upper edge 24. The lip 38 of the second vessel 14 includes a recess 50 and a horizontal tab 52 on each side of the flange 36 to define an interlocking hook. The second vessel 14 is placed on the first vessel such that the locking tabs 26 are received in the recess 50 the lip 38. Rotation of the second vessel with respect to the first vessel causes the tabs 26 and 52 to engage in an inter-locking relationship.

The utensil can be used to heat only a single food item. The vessel of the invention is, however, particularly suitable for heating two different kinds of foods. In preferred embodiments the two different foods being heated have different dielectric constants and, thus, absorb microwave energy at different rates. The food item requiring a longer period of time to heat or cook requires greater exposure to microwave energy. This food is placed in the first vessel 12. The vessel 12 is filled up to a mark 54 on the side wall 20 and the second vessel 14 is positioned on the first vessel as shown in FIG. 2. The mark 54 is positioned such that when the second vessel is placed on the first vessel, the contents do not spill over.

The food item requiring less time to heat or cook is placed in the second vessel. The lid 16 is placed on the vessel to cover the food. The entire utensil is then placed in a conventional microwave oven for a period of time sufficient heat the foods. The actual heating or cooking time, of course, varies depending upon the food items, volume of food, and oven power.

During exposure of the utensil to microwave energy, the microwaves pass through the side wall 20 of the vessel 12 and the cover 16 to heat the food items. Microwave energy does not, generally, pass through the wall 32 of the inner vessel 14, but instead is absorbed by the food in the annular space 42. The annular space 42 is, preferably, a uniform thickness throughout the height such that the microwaves penetrate the food to directly heat a substantial portion of the column of food. The microwaves also pass through the cover 16 to heat the upper surface of the food within the second vessel 14. The contents of the second vessel 14 are shielded from microwaves passing through the side walls to the extent that the contents in the annular space absorb a substantial portion of the microwaves. Since the food in second vessel 14, preferably, requires less time to heat or cook, the amount of microwave energy passing through the cover and striking the upper surface of the food is sufficient to heat the food item by the time the food in the first vessel 12 is heated. In addition, heat from the food in the annular space is conducted through the wall 32 to further assist in heating the food.

The raised center portion 28 of the first vessel 12 and the bottom 30 of the second vessel 14 reduce the amount of food in the center area of the vessel. The amount of food contained in the center is sufficiently small that the food can be readily heated or cooked by the heat being conducted through the food from the annular space and the bottom 30 of the second vessel 14.

The utensil 10 is particularly suitable for heating two different foods requiring different amounts of energy to heat. For example, spaghetti sauce placed in the first vessel 12 and, previously cooked spaghetti can be placed in the second vessel. The cover is then placed on the second vessel, and the second vessel is placed on the first vessel. Since the sauce requires a longer heating time compared to the spaghetti, the greater surface area of the sauce is subjected to microwaves and thoroughly heats the sauce by the time the spaghetti is heated.

Although this invention has been described with a certain degree of particularity, it should be understood that the present disclosure has been made only by way of example and that numerous changes in the details of construction and in the combination and arrangement of parts and in the methods described may be resorted to without departing from the spirit and scope of the invention.

I claim:

1. An utensil for heating and cooking foods in a microwave oven comprising:
a first microwave transparent vessel for holding a first food material having a first microwave absorbing property, said first vessel having a bottom wall, a substantially frusto-conical side wall converging toward said bottom wall, and an upper annular edge;

a second microwave transparent vessel for holding a second food material having a second microwave absorbing property, said second vessel having a bottom wall, a frusto-conical side wall having an upper end, and a depending flange extending outwardly from said upper end, said second vessel being disposed within said first vessel whereby said side walls of the first and second microwave transparent vessels are in a spaced relationship and said side wall of said second vessel compliments the side wall of said first vessel whereby a substantially uniform annular space is defined between said side walls of said first and second vessels; and a microwave permeable cover on said second vessel.

2. The utensil in accordance with claim 1, wherein said bottom wall of said first vessel includes a central portion extending upwardly into the interior of said first vessel toward the bottom wall of said second vessel.

3. The utensil in accordance with claim 1, wherein said utensil includes means to removably couple said second vessel to said first vessel.

4. The utensil in accordance with claim 1, wherein said first vessel includes first and second oppositely disposed tabs extending outwardly from said upper annular edge, and said depending flange of said second vessel includes hook means for coupling with said tabs by relative rotation of said second vessel with respect to said first vessel.

5. The utensil in accordance with claim 1, wherein said second vessel includes vent means to vent vapor from said first vessel.

6. The utensil in accordance with claim 1, wherein said cover includes vent means for venting the second vessel.

7. The utensil in accordance with claim 1, wherein said second vessel includes handle means.

8. An utensil for heating and cooking foods in a microwave oven comprising:

a first microwave transparent vessel for holding a first food material having a first microwave absorbing property, said first vessel having a bottom wall, a side wall depending from said bottom wall and terminating at an upper annular edge;

a second microwave transparent vessel for holding a second food material having a second microwave absorbing property, said second vessel having a bottom wall, a side wall depending from said bottom wall and having an upper end, and means for suspending said second vessel within said first vessel whereby said side walls are in a spaced relationship and said side wall of said second vessel complements said side wall of said first vessel to define a substantially annular cooking space of substantially uniform cross-section; and a microwave permeable cover on said second vessel.

9. The utensil in accordance with claim 8 wherein said bottom wall of said first vessel includes a center portion extending upwardly toward said second vessel.

10. A method of simultaneously microwave heating a first food having a first microwave absorbing property and a second food having a second microwave absorbing property, said method comprising:

placing said first food in a first microwave transparent vessel having a bottom wall, an upwardly extending side wall depending from said bottom wall and terminating at an upper annular edge;

placing said second food in a second microwave transparent vessel having a bottom wall, an upwardly extending side wall depending from said bottom wall and terminating at an upper annular edge;

placing said second vessel in said first vessel to displace a portion of said first food and to define a substantially annular heating space of substantially uniform cross-section containing said first food;

exposing said first and said second vessels to microwave energy; and placing a microwave transparent cover over said second vessel.

11. The method in accordance with claim 10 wherein said bottom wall of said first vessel includes a center portion extending upwardly from said bottom wall.

12. The method in accordance with claim 10 wherein said bottom wall of said second vessel is substantially spherical shaped.

13. The method in accordance with claim 10 wherein said upper edge of said first vessel includes a pair of outwardly extending tabs and said second vessel includes a pair of hook means complementing the tabs for removably coupling said second vessel to said first vessel.

* * * * *